(12) United States Patent
Muroi

(10) Patent No.: US 8,730,530 B2
(45) Date of Patent: May 20, 2014

(54) IMAGE READING SYSTEM AND IMAGE READING APPARATUS

(75) Inventor: Kazushige Muroi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 199 days.

(21) Appl. No.: 13/352,596

(22) Filed: Jan. 18, 2012

(65) Prior Publication Data

US 2012/0194880 A1    Aug. 2, 2012

(30) Foreign Application Priority Data

Jan. 28, 2011 (JP) ................................ 2011-016832

(51) Int. Cl.
*H04N 1/04* (2006.01)
*G06K 15/00* (2006.01)
*H04N 1/60* (2006.01)
*H04N 1/40* (2006.01)
*G06T 5/00* (2006.01)
*H04N 1/00* (2006.01)
*B65H 33/04* (2006.01)

(52) U.S. Cl.
USPC ........... 358/474; 358/1.14; 358/1.9; 358/448; 358/3.26; 358/498; 358/403; 358/3.1; 270/58.08

(58) Field of Classification Search
USPC ........ 358/474, 1.14, 1.9, 448, 3.26, 498, 403, 358/3.1; 270/58.08
See application file for complete search history.

(56) References Cited

U.S. PATENT DOCUMENTS

| 5,781,785 | A | 7/1998 | Rowe et al. |
| 6,332,149 | B1 | 12/2001 | Warmus et al. |
| 7,623,269 | B2 * | 11/2009 | Higashiura .................... 358/3.1 |
| 2004/0143796 | A1 | 7/2004 | Lerner et al. |
| 2005/0105145 | A1 * | 5/2005 | Yoo et al. ...................... 358/498 |
| 2006/0291727 | A1 | 12/2006 | Bargeron |
| 2010/0322519 | A1 | 12/2010 | Kasuya et al. |

FOREIGN PATENT DOCUMENTS

| JP | H05-116484 A | 5/1993 |
| JP | 2001-265164 A | 9/2001 |
| JP | 2004-064437 A | 2/2004 |
| JP | 2005-269095 A | 9/2005 |
| JP | 2006-191421 A | 7/2006 |

(Continued)

OTHER PUBLICATIONS

Japan Patent Office, Notification of Reason for Refusal for Japanese Patent Application No. 2011-016832 (counterpart Japanese patent application), dispatched Dec. 25, 2012.

(Continued)

*Primary Examiner* — Charlotte M Baker
*Assistant Examiner* — Rury Grisham
(74) *Attorney, Agent, or Firm* — Baker Botts L.L.P.

(57) ABSTRACT

An image reading system and an image reading apparatus is provided. The system or apparatus includes a reading unit configured to read an original, a determining unit configured to determine whether there exists a folded portion at a corner of the original, and a generating unit configured to generate a file including an image area which stores image data of the original read by the reading unit and a non-image area which stores data other than the image data, and configured to write fold information in the non-image area if the determining unit determines that there exists a folded portion, the fold information indicating that the folded portion exists in the read original.

19 Claims, 10 Drawing Sheets

(56) References Cited

FOREIGN PATENT DOCUMENTS

| | | |
|---|---|---|
| JP | 2008-219330 A | 9/2008 |
| JP | 2009-094596 A | 4/2009 |
| JP | 2010-088037 A | 4/2010 |
| JP | 2010-160611 A | 7/2010 |
| JP | 2010-204906 A | 9/2010 |
| WO | 2010/021098 A1 | 2/2010 |

OTHER PUBLICATIONS

European Patent Office, extended European Search Report for European Patent Application No. 12151203.2 (counterpart to above-captioned patent application), dated Apr. 4, 2012.

Coyle, Karen, "E-Reading", The Journal of Academic Librarianship, available online Feb. 20, 2008, pp. 160-162, vol. 34, No. 2.

* cited by examiner

IMAGE READING SYSTEM AND IMAGE READING APPARATUS

CROSS-REFERENCE TO RELATED APPLICATION

This application claims priority from Japanese Patent Application No. 2011-016832, filed on Jan. 28, 2011, the entire subject matter of which is incorporated herein by reference.

TECHNICAL FIELD

Aspects of the present invention relate to an image reading system and an image reading apparatus for reading an original, and particularly, to an image reading system and an image reading apparatus for generating a file based on image data of the read original.

BACKGROUND

Recently, there have been widely used portable information terminal devices having touch panels. Since some portable information devices allow electronic books to be browsed, there is a need to computerize bound books. For this reason, some image reading apparatuses have a function of reading a bound original such as a book in a double-page spread state. Those image reading apparatuses read an original in a double-page spread state (a double-page spread original), and then generate an electronic file based on image data of the read original.

For example, JP2005-269095A describes an image reading apparatus for reading books. The image reading apparatus employs technique of reading a double-page spread original and separately performing image correction on an image of a right page and an image of a left page.

SUMMARY

However, the related-art image reading apparatus has the following problem. That is, people customarily fold down corners of pages and use the folded portions (dog ears) as marks for facilitating browsing of those pages, that is, it is customarily practiced to put marks on books. However, in the relate-art image reading apparatus, when the books are computerized, information on the marks cannot be transferred.

Accordingly, an aspect of the present invention provides an image reading system and an image reading apparatus which can transfer information on a folded portion to a file.

According to an illustrative embodiment of the present invention, there is provided an image reading system comprising: a reading unit configured to read an original; a determining unit configured to determine whether there exists a folded portion at a corner of the original; and a generating unit configured to generate a file including an image area which stores image data of the original read by the reading unit and a non-image area which stores data other than the image data, and configured to write fold information in the non-image area if the determining unit determines that there exists a folded portion, the fold information indicating that the folded portion exists in the read original.

According to the above configuration, the image reading system and the image reading apparatus can transfer information on folded portion to a file.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, an image reading apparatus according to an illustrative embodiment of the present invention will be described in detail with reference to the accompanying drawings. In this illustrative embodiment, a multi-function peripheral having a scanning function, a printing function, and a file outputting function is applied with an inventive concept of the present invention.

[Configuration of MFP]

Figure 1:
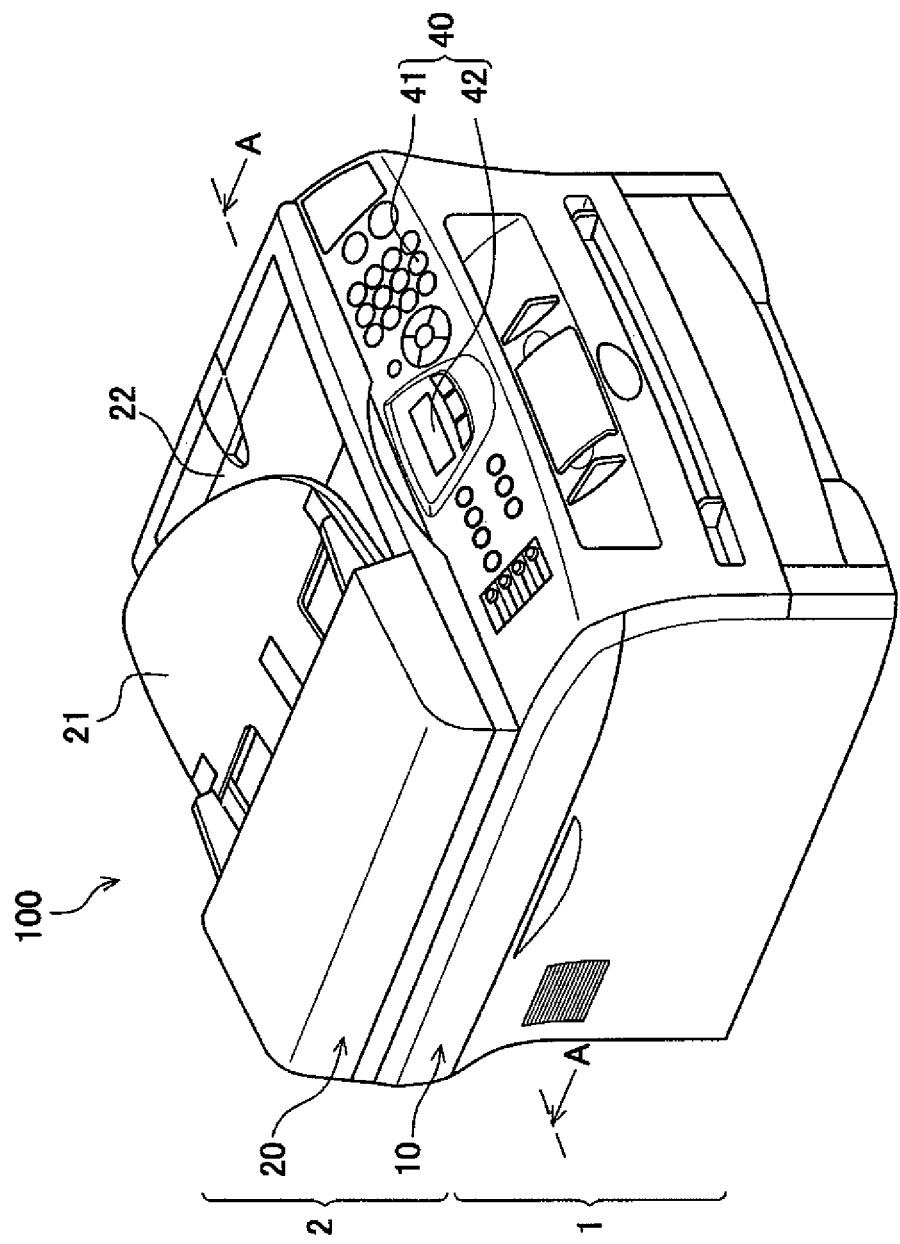
FIG. 1 is a perspective view illustrating an outer appearance of a multi-function peripheral (MFP) according to an illustrative embodiment.

As shown in FIG. 1, an MFP 100 according to the illustrative embodiment includes an image forming unit 1 which prints images on sheets and an image reading unit 2 (an example of a reading unit) which reads images of an original. An image forming system of the image forming unit 1 may be an electro-photographic system or an ink-jet system. Also, the image forming unit 1 may have a color-image forming function, or may be for only monochrome images.

Further, the MFP 100 includes an operation panel 40 on the front side. The operation panel 40 includes a button group 41 including various buttons (for example, a start key, a stop key, and individual buttons of a numeric keypad), and a display unit 42 that is configured by a liquid crystal display. The button group 41 and the display unit 42 enable display of an operation status and allow a user to perform input operation.

[Configuration of Image Reading Unit]

Figure 2:
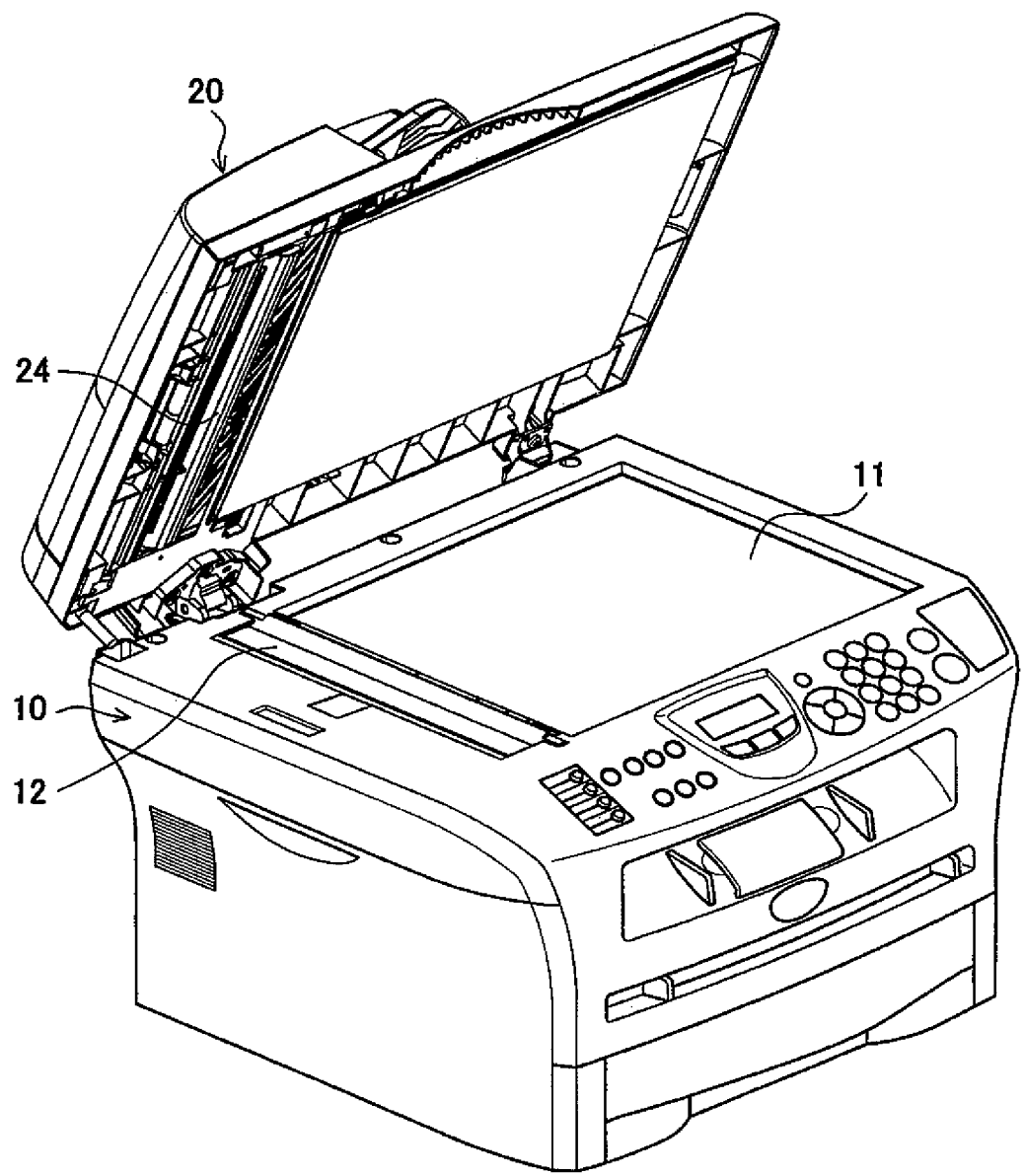
FIG. 2 is a perspective view illustrating the MFP shown in FIG. 1 when an automatic document feeder (ADF) is open.
Figure 3:
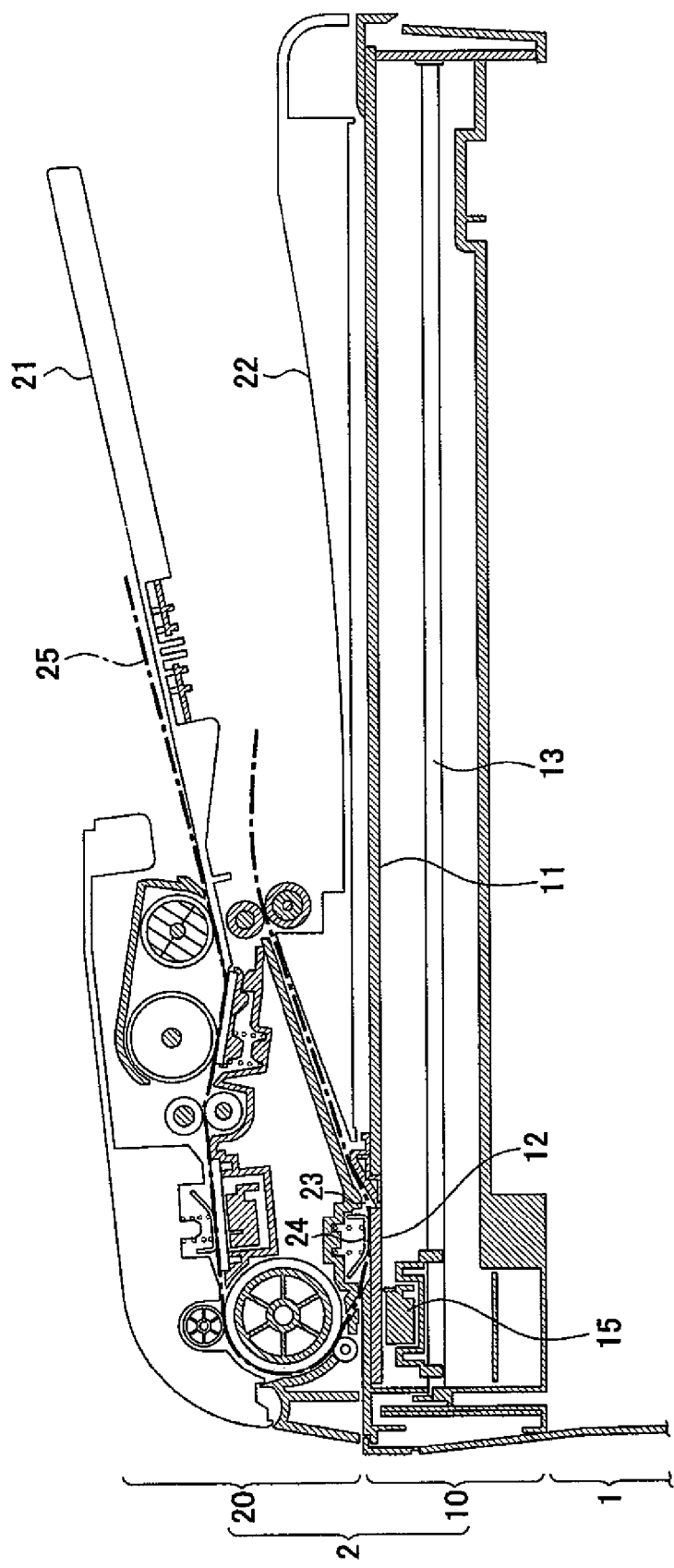
FIG. 3 is a cross-sectional view illustrating an internal configuration of an image reading unit of the MFP shown in FIG. 1 as taken along line A-A of FIG. 1.

Next, a configuration of the image reading unit 2 will be described with reference to FIGS. 1 to 3. FIGS. 1 and 2 show an outer appearance of the image reading unit 2, and FIG. 3 shows an internal configuration of the image reading unit 2.

The image reading unit 2 includes a main body unit 10 which reads images, and an automatic document feeder (ADF) 20 which automatically transfers an original. The ADF 20 is positioned above the main body unit 10, and has one side connected to the main body unit 10 so as to be rotatable with respect to the main body unit 10. Therefore, in the image reading unit 2, an upper surface of the main body unit 10 is openable and closeable by the ADF 20 (see FIG. 2). In other words, the ADF 20 functions as a cover for covering the upper surface of the main body unit 10.

The main body unit 10 includes contact glasses 11 and 12 provided on the upper surface. Further, inside the main body unit 10, an image sensor 15 which reads images of an original is provided below the contact glasses 11 and 12. The image sensor 15 includes optical elements arranged in line in a main scan direction (a depth direction of FIG. 3), and converts reflected light from an original into an electrical signal and outputs the electrical signal. As the image sensor 15, for example, a contact image sensor (CIS) and a charge coupled device (CCD) can be applied.

The image sensor 15 is supported to be slidable with respect to a slide shaft 13. The slide shaft 13 extends in a sub-scan direction (the left-right direction of FIG. 3) and has two end portions fixed to a housing of the main body unit 10. Therefore, the image sensor 15 is provided to be movable in the left-right direction of FIG. 3.

The ADF 20 includes an original tray 21 which holds an unread original, and a discharge tray 22 which holds a read original. Specifically, the original tray 21 is disposed above the discharge tray 22. Further, inside the ADF 20, a substantially U-shaped transfer path 25 that connects the original tray 21 and the discharge tray 22 is provided as an original transfer path. Furthermore, a lower surface of the ADF 20 is formed with an opening 23 such that an original pressing plate 24 is exposed from the opening 23. The original pressing plate 24 faces the contact glass 12 in a state where the ADF 20 is closed.

The ADF 20 picks up an original put on the original tray 21 one sheet by one sheet, and transfers the original to a position facing the contact glass 12 (hereinafter, referred to as ADF glass 12) of the main body unit 10. Specifically, the original passes between the original pressing plate 24 and the contact glass 12. Then, the original is discharged onto the discharge tray 22.

As an original reading system using the image sensor 15, there are a flat bed (fixed-original scanning) system and an ADF (moving-original scanning) system. In a case of the flat bed system, an original is put on the contact glass 11 (hereinafter, referred to as FB glass 11). In this state, while the image sensor 15 moves in the sub-scan direction, an image of the original is read in the main scan direction one line by one line. Meanwhile, in a case of the ADF system, a plurality of pages of an original are put together on the original tray 21. Then, the image sensor 15 moves to the position facing the ADF glass 12 and is fixed at the position. In this state, the ADF 20 transfers each page of the original to a position that is below the original pressing plate 24 and faces the ADF glass 12, and then, an image of the original is read in the main scan direction one line by one line.

For example, in a case of reading a bound original such as a book, the ADF 20 is opened as shown in FIG. 2, the original is made a double-page spread state, and the double-page spread original is set on the FB glass 11 with a surface to be read being downward. Then, in a state where the user presses the original while the ADF 20 is open, the image sensor 15 moves in the sub-scan direction so as to read the original.

[Electrical Configuration of MFP]

Figure 4:
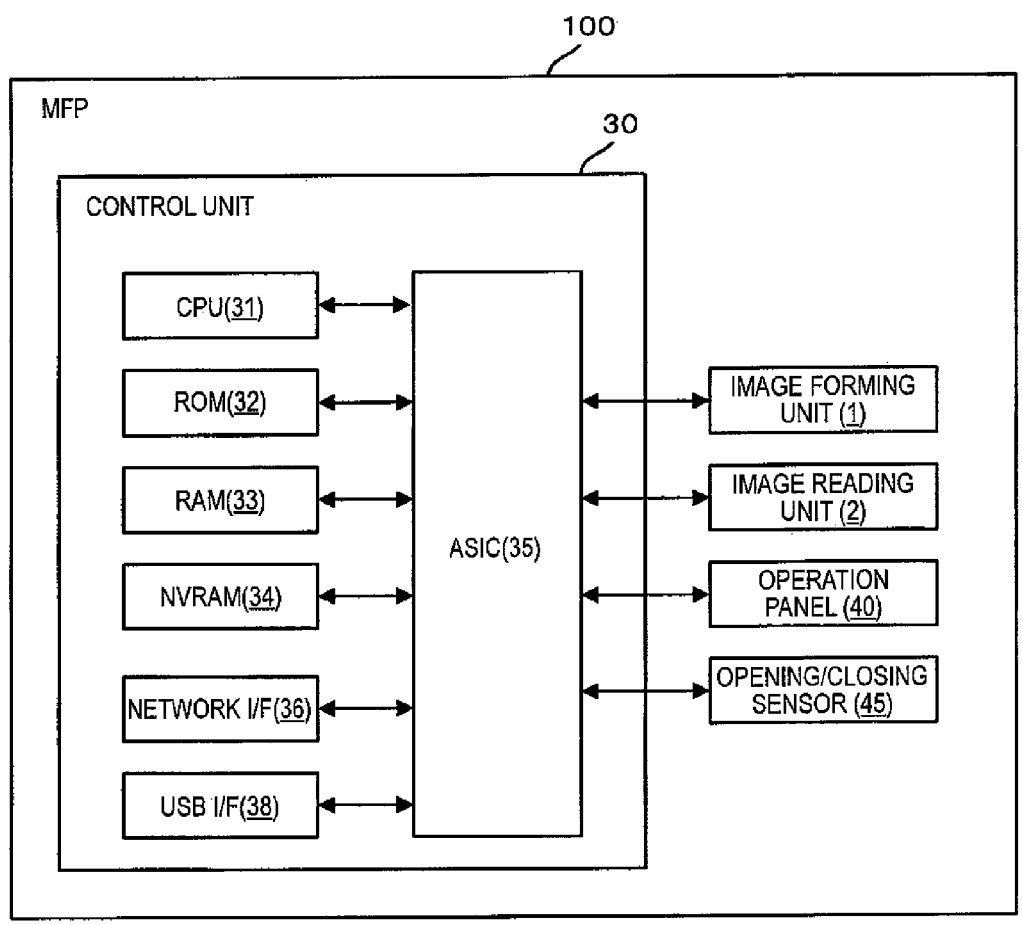
FIG. 4 is a block diagram illustrating an electrical configuration of the MFP shown in FIG. 1.

Next, an electrical configuration of the MFP 100 will be described. As shown in FIG. 4, the MFP 100 includes a control unit 30. The control unit 30 includes a CPU 31, a ROM 32, a RAM 33, a non-volatile RAM (NVRAM) 34, an ASIC 35, a network interface 36, and a USB interface 38.

The ROM 32 stores various control programs for controlling the MFP 100, image processing programs, various settings, initial values, and so on. The RAM 33 is used as a work area into which various control programs are read, or as a storage area for temporarily storing image data of an original read by the image reading unit 2 or image data transmitted through the network interface 36. The NVRAM 34 is a non-volatile storage means, and is used as a storage area for storing various settings, image data, and so on.

The ASIC 35 is electrically connected to the image forming unit 1, the image reading unit 2, the operation panel 40, an opening/closing sensor 45 for sensing opening of the ADF 20, and so on. For example, the ASIC 35 acquires a signal of image data from the image reading unit 2. Further, the ASIC 35 outputs a signal for generating a desired image to the image forming unit 1. Furthermore, the ASIC 35 receives a signal of various buttons input to the button group 41. Moreover, the ASIC 35 outputs a signal of contents to be displayed in the display unit 42.

The CPU 31 (an example of a determining unit, a generating unit, a specifying unit, or a confirming unit) performs operations for implementing various functions, such as an image reading function, an image forming function, and a file generating function, in the MFP 100, and serves as the center of control. The CPU 31 stores process results in the RAM 33 or the NVRAM 34 in accordance with control programs read from the ROM 32, and controls each component of the MFP 100 through the ASIC 35. Further, the CPU 31 processes image data of an original read by the image reading unit 2, for example, in accordance with programs read from the ROM 32.

The network interface 36 is connected to a network, and the MFP 100 can perform data communication with other information processing apparatuses (not shown) through the network interface 36. The USB interface 38 is connected to a peripheral (not shown) capable of USB connection, and the MFP 100 can perform data communication with an external peripheral, or the like through the USB interface 38.

[Book Scan Mode]

Next, a book scan mode of the MFP 100 will be described. The book scan mode is a mode of reading a bound original such as a book in a double-page spread state, and generating an electronic file storing image data of the read original.

In the book scan mode, an original in a double-page spread state (double-page spread original) is read by the flat bed system. Specifically, if the MFP 100 is set in the book scan mode by the user, a double-page spread original is set on the FB glass 11, and the start key of the button group 41 is pushed, the double-page spread original is read by the image reading unit 2.

After the double-page spread original is read, whether to continue reading is asked to the user. If it is selected to continue reading, the MFP 100 stands by until the user turns to the next page, sets the double-page spread original on the FB glass 11, and inputs a read start instruction. Then, if a read start instruction is input, the newly set double-page spread original is read. Meanwhile, if it is selected to stop reading, the MFP 100 generates a file in a format (for example, a PDF file) capable of storing data of a plurality of images, based on image data of one or more images having been read until the selection of stop.

Further, the MFP 100 has a division mode and a non-division mode as modes for storing image data of a double-page spread original. In the division mode, the image data of the double-page spread original is divided into image data of a left page and image data of a right page, and the image data of two pages is stored in a file. In the non-division mode, the image data of the double-page spread original is stored as image data of one page in a file, without being divided.

[Book Scanning Process]

Figure 5:
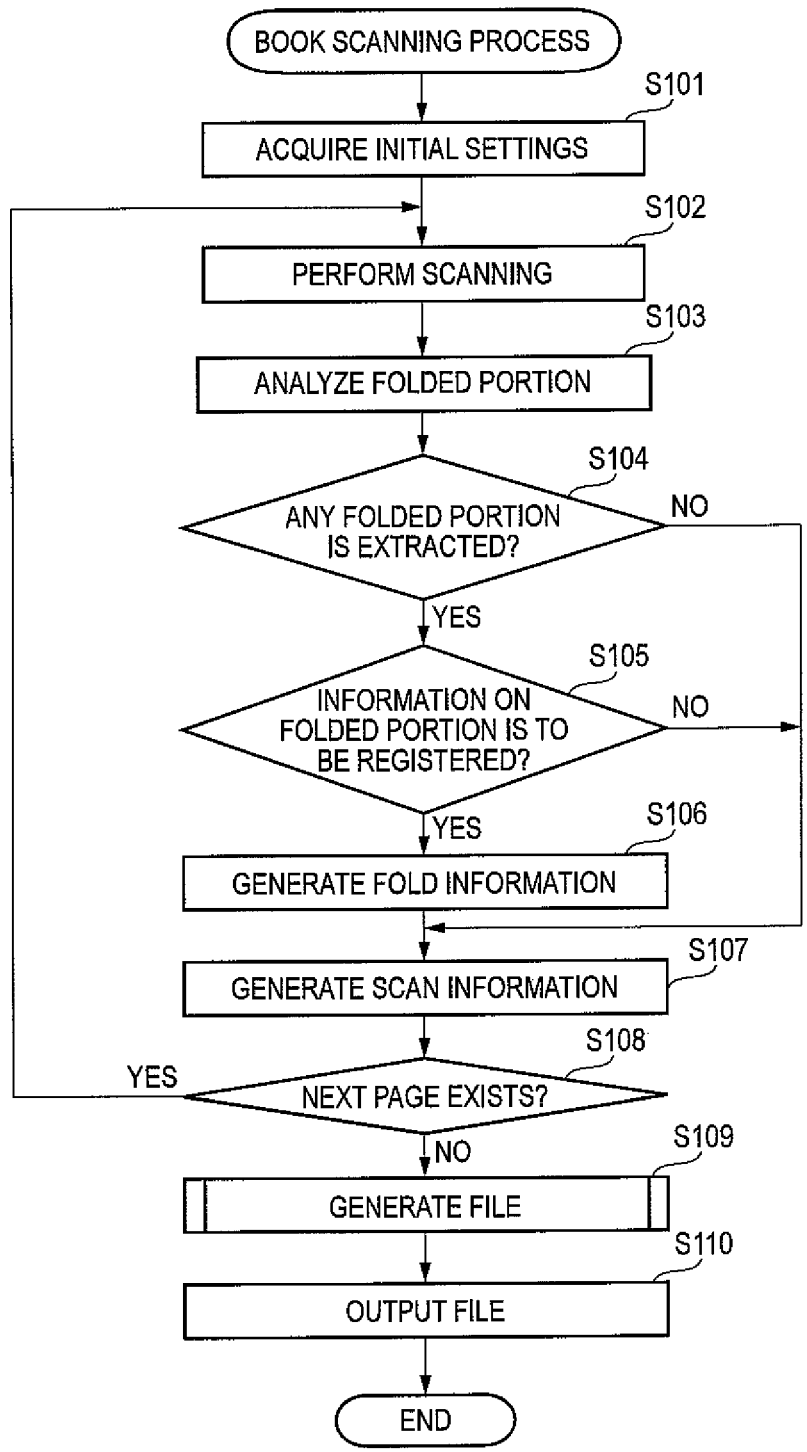
FIG. 5 is a flowchart illustrating a procedure of a book scanning process of the MFP.

Hereinafter, a procedure of the book scanning process (an example of a reading unit, a determining unit, a generating unit, a specifying unit, or a confirming unit) for implementing an operation in the book scan mode will be described with reference to FIG. 5. If the start key of the button group 41 is pushed in the book scan mode, the book scanning process is performed.

In the book scanning process, in S101, various initial settings are acquired. The initial settings include a setting on whether to erase a binding portion of an original and shadow of a frame from image data after reading, and a setting on whether the MFP 100 is in the division mode or the non-division mode. In a case of the division mode, the initial setting further includes a setting on whether to turn over an original from left to right or from right to left. The initial settings are set by the user before the book scanning process starts. The initial settings my be stored in the NVRAM 34 or the like, or may be asked to the user at a timing when S101 is performed, and set at this timing.

Next, if the start key is pushed, in S102, the original set on the FB glass 11 is read by the image reading unit 2. Image data of the read original is temporarily stored in the RAM 33.

Figure 6:
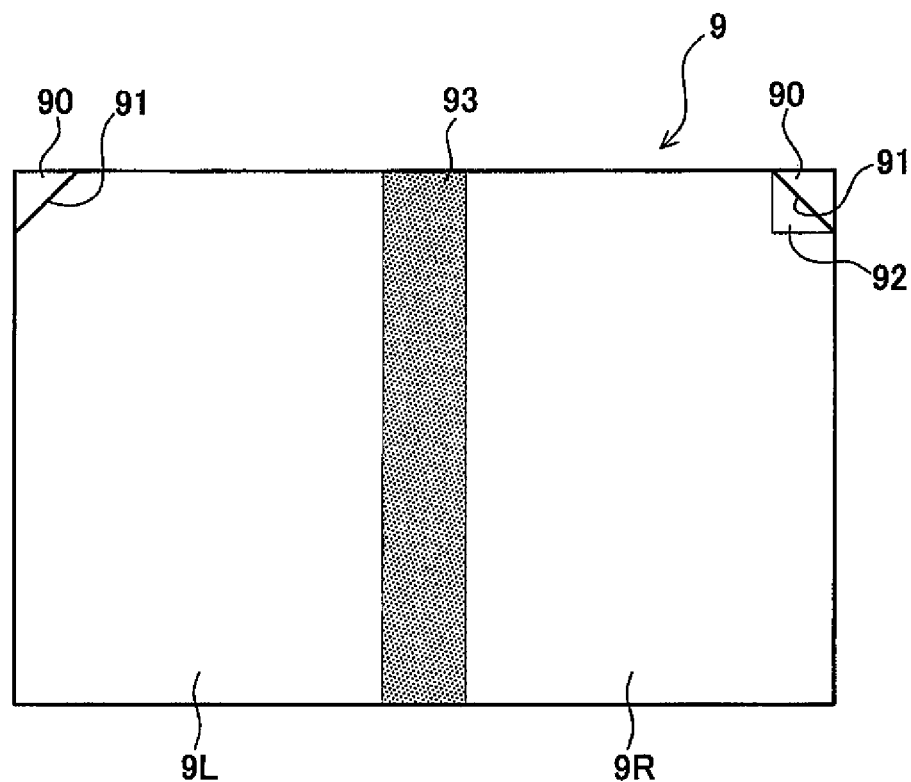
FIG. 6 is a view illustrating an example of image data of an original having folded portions.

Next, in S103, the image data of the original read in S102 is analyzed and a portion corresponding to a folded portion of the original is extracted from the image data. If there exists a folded portion in the original, as shown in FIG. 6, there appears a straight line 91 corresponding to a fold line at any one of four corners in the image data 9 of the original. At a folded-down corner portion of an original, the next page or the previous page is read, and a right-angled triangle image 90 is formed by the straight line 91 and a right-angled portion corresponding to the corner of the next page or the previous page. Therefore, it is determined whether there exists any right-angled triangle image 90, and if there exists any right-angled triangle image 90, the image 90 can be extracted as a folded portion.

If the folded portion has a valley fold, there is a right-angled triangle image 92 having the long side 91 (fold) of the right-angled triangle image 90 as a common long side. Therefore, it is determined whether an extracted folded portion has a valley fold, based on whether there exists a right-angled triangle image 92 adjacent to a right-angled triangle image 90. The image 90 and the image 92 becomes almost the same as each other. Therefore, the area of the image 90 and the area of the image 92 may be compared to each other, it may be determined that the folded portion has a valley fold if the areas are within the same range.

In the MFP 100, a fold determining setting for determining a folded portion of an original is stored in advance. The fold determining setting indicates a setting on whether to determine, as folded portions, only mountain folds, only valley folds, or both of the mountain folds and the valley folds. In S101, the fold determining setting is also acquired. Then, in S103, only folds set in the fold determining setting are extracted as folded portions. In other words, folds that are not set in the fold determining setting are not extracted as folded portions.

Next, in S104, it is determined whether any folded portion is extracted as a result of the analysis of S103. If any fold is extracted (YES in S104), in S105, it is determined whether to register information on the corresponding folded portion (fold information) in a file. In other words, the folded portions of the original include folded portions intentionally folded down by the user, and folded portions unintentionally folded down. In S105, the intentional folded portions and the unintentional folded portions are distinguished from each other. In the present illustrative embodiment, if a registration setting on whether to register fold information in a file is not stored, the user is asked whether to register the fold information in a file. A result of the inquiry is stored as the registration setting.

In other words, the inquiring to the user in S105 is performed once during the book scanning process, and thereafter, registration of information on a folded portion in a file is performed according to the stored registration setting. If the registration setting has been performed in advance before the book scanning process starts or immediately after the book scanning process starts (S101), the stored registration setting may be read.

If it is determined to register information on the folded portion in the file (YES in S105), in S106, fold information regarding the image data from which the folded portion is extracted is generated. The fold information includes existence or non-existence of a folded portion, and information on a position of the folded portion if exists. As a position of a folded portion, relative position information, which is classified into four, that is, an upper right side, a lower right side, an upper left side, and a lower left side, is generated. If it is determined not to register information on folded portions in the file (NO in S105), the process of S106 is skipped.

After S106, or in the case where it is determined not to register information on folded portion (NO in S105), or in the case where no folded portion is extracted (NO in S104), in S107, scan information regarding the original read in S102 is generated. The scan information includes the image data acquired in S102. If there is any fold information generated in S106, the scan information further includes the fold information.

Next, in S108, it is determined whether there is the next page original. Existence or non-existence of the next page is determined by inquiring to the user. If the start key is pushed to instruct reading of the next page original within a predetermined time period, it may be determined that the next page exists. If the next page exists (YES in S108), that is, in a case of continuing reading of the original, the book scanning process proceeds to S102 where the next page original is read.

If the next page does not exist (NO in S108), in S109, a file generating process of generating a file storing all of the read image data is performed using the scan information generated until that time. The file may have a format of a general file (for example, a PDF file) or a dedicated file format.

Figure 7:
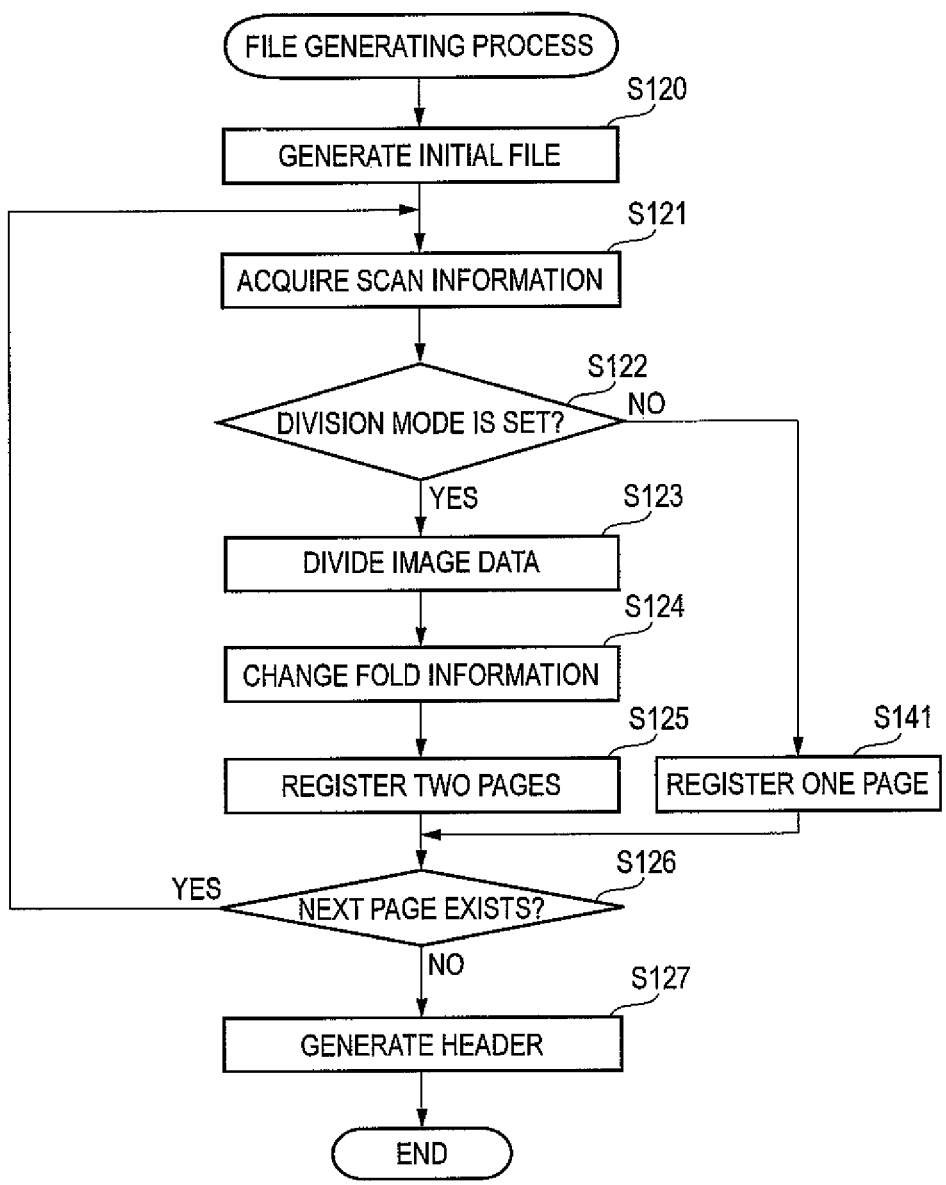
FIG. 7 is a flow chart illustrating a procedure of a file generating process of the book scanning process.

The file generating process of S109 will be described with reference to a flowchart of FIG. 7. In the file generating process, first, in S120, an initial file which has no information registered is generated. The file includes an image data area (an example of an image area) for storing image data and a header area (an example of a non-image area) for storing information other than image data.

Next, in S121, the scan information of the firstly read original is acquired. Then, in S122, it is determined whether the division mode is set. The division mode may be set at the initial setting acquired in S101.

If the division mode is set (YES in S122), in S123, the image data acquired in S102 is analyzed and is divided into the image data of the left page and the image data of the right page. If an original is read in a double-page spread state, as shown in FIG. 6, a black area 93 (corresponding to a binding area) passing through the center of the image data 9 exists. For example, the division into the left page and the right page can be performed by extracting the black area 93 and dividing the image data into image data 9L of the left page and image data 9R of the right page using the black area 93 as a boundary. Alternatively, based on the left-right dimension of the image data 9 of the original, the image data may be divided into two equal parts, that is, a left part and a right part.

Next, in S124, the fold information included in the scan information is changed. In other words, with respect to a page of an image which does not have a folded portion any more as a result of the division, the fold information is changed to non-existence of a folded portion. Further, after the division, since information on a left side and a right side is unnecessary for the position information of a folded portion, the position information is changed from four classifications of the upper right side, the lower right side, the upper left side, and the lower left side into two classifications of the upper side and the lower side.

After S124, scan information is generated for image data on the left page and the right page. Then, in S125, based on the setting on whether to turn over an original from left to right or from right to left, the scan information on the left page and the right page is registered according to page number in the file generated in S120. Further, in S125, if the fold information is included in the scan information, the fold information is temporarily stored in association with the page number.

Meanwhile, if the division mode is not set, that is, in a case where the non-division mode is set (NO in S122), in S141, the image data included in the scan information is registered as data on one page in the file generated in S120. In other words, even image data of a double-page spread original which becomes two pages in an actual original is treated as image data on one page. Further, in S141, if the fold information is included in the scan information, the fold information is temporarily stored in association with the page number.

After S125, or after S141, in S126, it is determined whether there is scan information on the next page. If there is scan information on the next page (YES in S126), the file generating process proceeds to S121 where registration of information regarding the next page in the file is performed.

Figure 8:
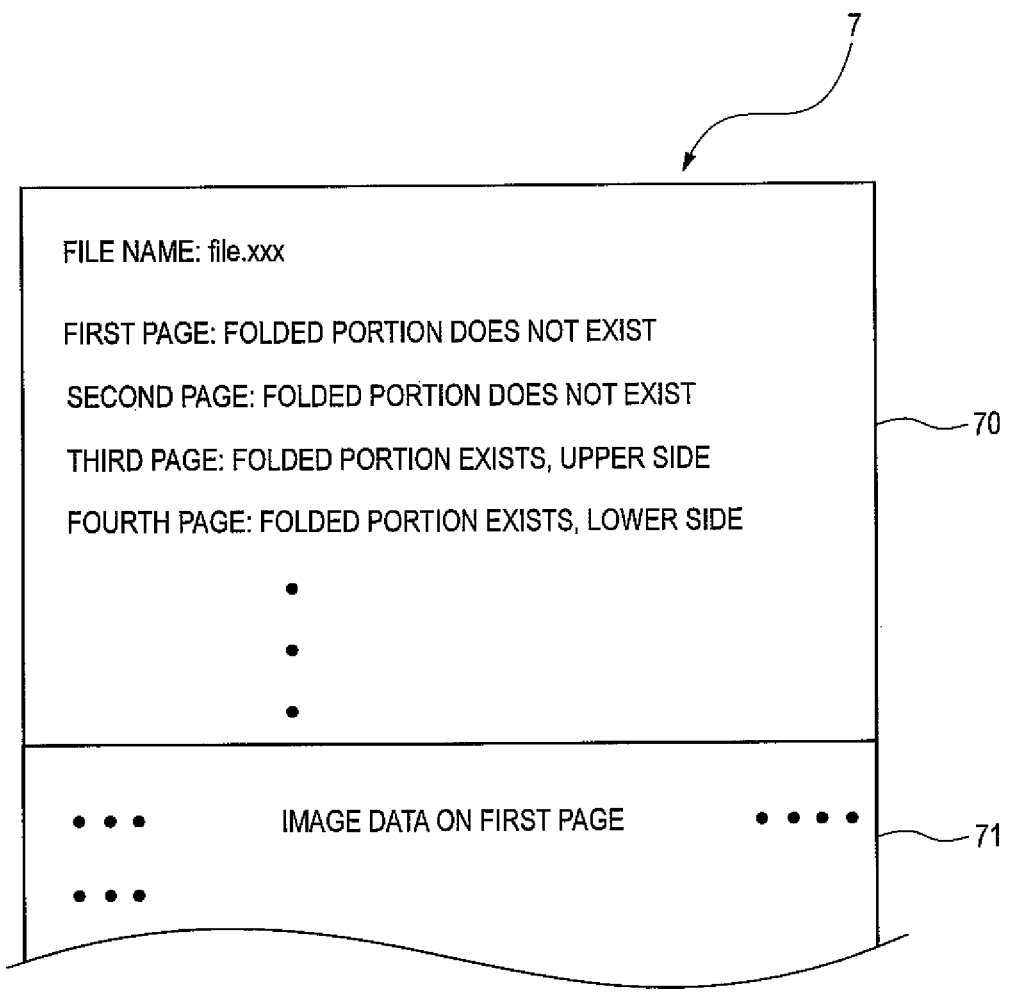
FIG. 8 is a view illustrating a first example of a configuration of a file.

If scan information on the next page does not exist (NO in S126), in S127, header information of the file is generated. Specifically, as shown in FIG. 8, the file 7 generated in S120 includes the header area 70 for storing information other than image data, and the image data area 71 for storing the image data of the original read until that time. Then, in S127, the contents of the fold information of each page are written in the header area 70. The fold information includes information on existence or non-existence of a folded portion and a page number associated with each other, and further includes position information of the folded portion if exists. Since the fold information is written in the header area 70 (an example of the non-image area) that is an area other than the image data area 71, the fold information does not influence the images. Accordingly, the file having information on folded portions written therein is completed. After S127, the file is closed, and the file generating process of S109 ends.

After S109, in S110, the file is output to a predetermined storage device. The predetermined storage device may be the NVRAM 34 of the MFP, a flash memory connected to the USB interface 38, a PC connected through the network interface 36, or the like. After S110, the book scanning process ends.

Figure 9:
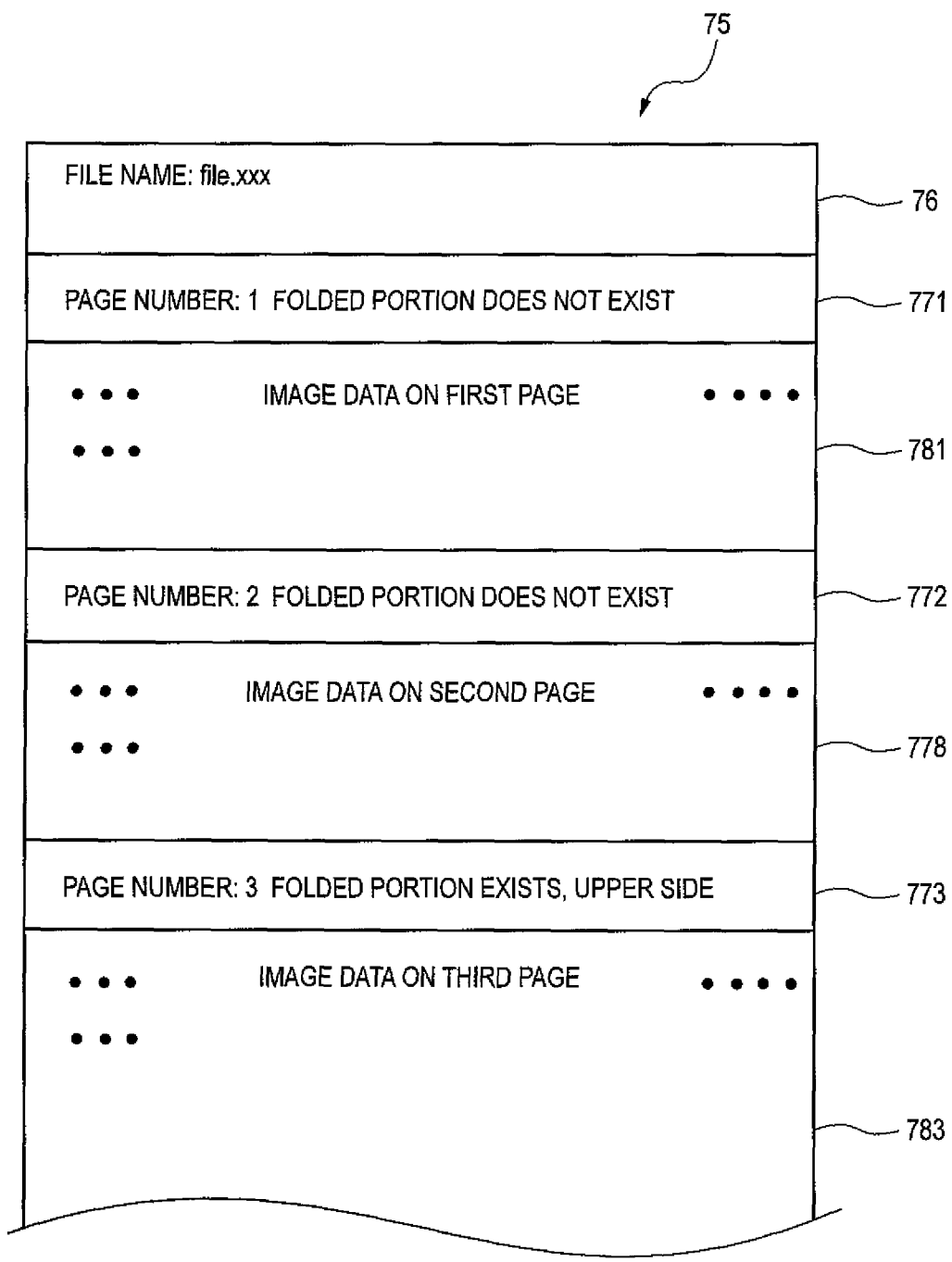
FIG. 9 is a view illustrating a second example of a configuration of a file.

In the above-described book scanning process, the fold information of each page is collectively written in the header area of the file. However, the write destination of the fold information is not limited to the header area. For example, as shown in FIG. 9, if a file 75 storing the image data has a format including a header area 76 for storing information on the overall file, image data areas (781, 782, and 783 in FIG. 9) for storing image data for each page, and non-image areas (771, 772, and 773 in FIG. 9) for storing data other than the image data for each page, fold information on each page may be written in a corresponding non-image area. In this case, when the image data is registered in S125 or S141, the fold information may also be registered together with the image data.

Particularly, for example, if the generated file has a PDF format, the PDF file includes an area for writing bookmark information. Then, it is possible to write the fold information in the area for writing bookmark information.

[Viewer]

Next, a viewer for displaying the image data stored in the file generated by the book scanning process will be described. The viewer may be installed in the MFP 100 or may be installed in an information processing apparatus such as a PC.

Figure 10:
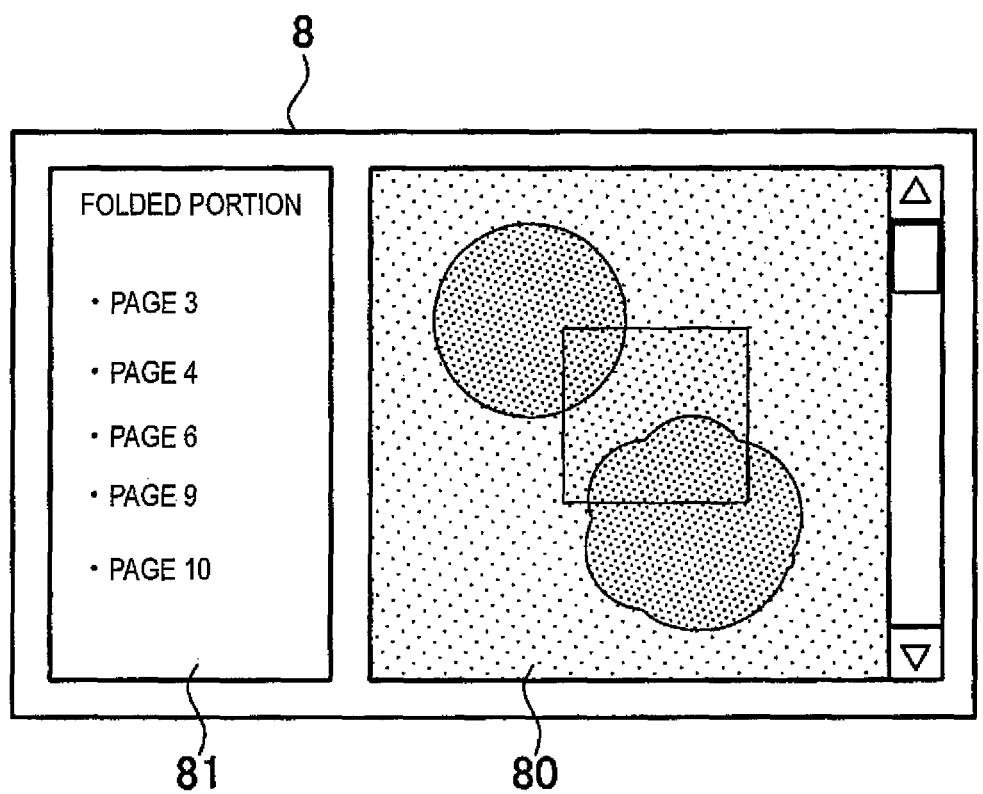
FIG. 10 is a view illustrating an example of a viewer that displays contents of a file.

The file generated by the book scanning process includes the fold information stored therein. Therefore, direct access to a page having a folded portion becomes possible by reading the fold information. For example, as shown in FIG. 10, in addition to an image display area 80 of a viewer 8, a list screen 81 of pages having folded portions is displayed. Then, if a page displayed in the list screen 81 is selected, an image corresponding to the selected page is displayed.

Further, the fold information includes positions of folded portions stored therein. Therefore, the viewer 8 can change the contents to be displayed in the list screen 81 in accordance with the positions of the folded portions. For example, position information representing the upper right side, the lower left side, or the like can be incorporated in a character string of page information. A folded portion positioned on the upper side and a folded portion positioned on the lower side can be displayed in characters being different in size. Alternatively, for example, only page numbers having folded portions positioned on the upper side (or lower side) may be displayed.

As described above, when reading the original in the book scan mode, the MFP 100 according to the present illustrative embodiment determines whether there exists any folded portion in the read original. Then, if there exists a folded portion in the read original, information indicating that there is a folded portion in the read original is written in the non-image area of the file storing the image data of the read original. Therefore, when the contents of the original are computerized, it is possible to transfer the fold information of the original to the file storing the image data of the original. Further, since the fold information is written in the non-image area of the file, the fold information has little effect on the image data stored in the image data area of the file. In other words, the fold information has little effect on image quality.

While the present invention has been shown and described with reference to certain illustrative embodiments thereof, it will be understood by those skilled in the art that various changes in form and details may be made therein without departing from the spirit and scope of the invention as defined by the appended claims.

For example, the present invention is not limited to the MFP, but is applicable to any apparatuses having an image reading function, such as a copy machine, a scanner, and a FAX. Further, the inventive concept of the present invention is also applicable to dedicated scanners for reading books.

Moreover, the image reading unit 2 of the present illustrative embodiment reads an original from below by the image sensor 15 positioned below the FB glass 11, while a read surface of the original facing downward. However, the configuration of the image reading unit 2 is not limited thereto. For example, a camera may be positioned over an original, and read the original with the camera from above. In the configuration where the original is read from above, for example, it may be determined whether there is any folded portion, based on whether any sheet exists at a predetermined height from an original mounting base.

In the present illustrative embodiment, the MFP 100 (image reading apparatus) determines whether there exists any folded portion, and generates a file reflecting fold information. However, determination on whether there exists any folded portion or generation of a file may be performed by an apparatus other than the MFP 100. For example, in a case of a system having a scanner and a PC, the scanner may read a double-page spread original, and the PC may determine whether there exists any folded portion and generate a file. Alternatively, the PC may perform one of determination on whether there exists any folded portion and generation of a file, and the scanner may perform the other one.

In the present illustrative embodiment, when a folded portion is extracted, that is, before scan information is generated, in S106, it is determined whether to include fold information in the file, and if the fold information is not required, the fold information is not written. However, a method of invalidating fold information is not limited thereto. For example, when a folded portion is extracted, fold information may be included in scan information, and when the fold information is written in the file (S127), it may be determined whether to include the fold information, and if the fold information is not required, the fold information may not be written in the file.

In the present illustrative embodiment, the relative position information is generated as information on the positions of the folded portions. However, information on absolute positions such as coordinates may be generated. Alternatively, both of relative position information and absolute position information may be generated.

In the present illustrative embodiment, classification based on the positions of the folded portions is performed. However, the classification of the folded portions is not limited to based on the positions. For example, the folded portions may be classified into three sizes: large, medium, and small, according to the areas of the folded portions (areas of the right-angled triangle images 90 shown in FIG. 6).

In the illustrative embodiments, one CPU 31 performs the various process. However, the present invention is not limited thereto. For example, a plurality of CPUs or dedicated circuit ASIC (Application Specific Integrated Circuit) may execute those process.

What is claimed is:

1. An image reading system comprising:
a reading unit configured to read an original;
a determining unit configured to determine whether there exists a folded portion at a corner of the original; and
a generating unit configured to generate a file including an image area which stores image data of the original read by the reading unit and a non-image area which stores data other than the image data, and configured to write fold information in the non-image area, the fold information including information on whether the folded portion exists that is determined by the determining unit and a page number, and the information on whether the folded portion exists and the page number being associated with each other.

2. The image reading system according to claim 1, wherein in a division mode of dividing the image data of the original read by the reading unit into image data for one page and image data for another page and writing the image data in the file as images of the two pages, the generating unit is configured to write, in the non-image area, fold information indicating that the folded portion exists in a page where the folded portion exists.

3. The image reading system according to claim 1, wherein the determining unit is configured to determine whether the folded portion has a mountain fold or a valley fold, and configured to determine that the folded portion exists if the folded portion has a predetermined fold which is one of the mountain fold and the valley fold.

4. The image reading system according to claim 1, further comprising:
a specifying unit configured to specify a position of the folded portion if the determining unit determines that the folded portion exists,
wherein the fold information includes position information indicating the position of the folded portion specified by the specifying unit.

5. The image reading system according to claim 4,
wherein the specifying unit is configured to specify the position of the folded portion in two classifications of an upper side and a lower side as the position information in a division mode of dividing the image data of the original read by the reading unit into two pages and writing the image data in the file as images of the two pages, and
wherein the specifying unit is configured to specify the position of the folded portion in four classifications of an upper-right side, a lower-right side, an upper-left side and a lower-left side as the position information in a non-division mode of writing the image data of the original read by the reading unit as an image of one page without dividing the image data.

6. The image reading system according to claim 1, further comprising:
a confirming unit configured to inquire to a user whether to write the fold information in the non-image area,
wherein, if the confirming unit confirms that the fold information is not to be written in the non-image area, the generating unit is configured not to write the fold information in the non-image area.

7. The image reading system according to claim 6,
wherein in response to the determining unit determining that there exists a folded portion, the confirming unit inquires to a user whether to write the fold information in the non-image area.

8. The image reading system according to claim 7,
wherein in a case where the original includes a plurality of pages and fold information for each page of the original is to be written in the non-image area,
once the inquiry is made on a folded portion in one page of the original, even if the determining unit determines that there exists a folded portion in other pages of the original, the confirming unit is configured not to make the inquiry,
if the confirming unit confirms to write the fold information on the folded portion of the confirmed page of the original in the non-image area, the generating unit is configured to write fold information of subsequently read pages of the original in the non-image area, and
if the confirming unit confirms not to write the fold information on the folded portion of the confirmed page of the original in the non-image area, the generating unit is configured not to write fold information of subsequently read pages of the original in the non-image area.

9. The image reading system according to claim 1,
wherein the determining unit is configured to determine that there exists a folded portion if a right-angled triangle image exists at a portion of the image data of the original corresponding to a corner of the original.

10. The image reading system according to claim 1,
wherein if the original includes a plurality of pages and fold information for each page of the original is to be written in the non-image area, the generating unit is configured to write the fold information for each page of the original in a single non-image area of the file.

11. The image reading system according to claim 1, wherein if the original includes a plurality of pages and fold information for each page of the original is written in the non-image area, the generating unit is configured to write the fold information for each page of the original in a non-image area of the file provided correspondingly to the image data of the corresponding page.

12. An image reading apparatus comprising:
a reading unit configured to read an original;
a determining unit configured to determine whether there exists a folded portion at a corner of the original; and
a generating unit configured to generate a file including an image area which stores image data of the original read by the reading unit and a non-image area which stores data other than the image data, and configured to write fold information in the non-image area, the fold information including information on whether the folded portion exists that is determined by the determining unit and a page number, and the information on whether the folded portion exists and the page number being associated with each other.

13. An image reading system comprising:
a reading unit configured to read an original;
a determining unit configured to determine whether there exists a folded portion at a corner of the original; and
a generating unit configured to generate a file including an image area which stores image data of the original read by the reading unit and a non-image area which stores data other than the image data, and configured to write fold information in the non-image area if the determining unit determines that there exists a folded portion, the fold information indicating that the folded portion exists in the read original,
wherein the determining unit is configured to determine whether the folded portion has a mountain fold or a valley fold, and configured to determine that the folded portion exists if the folded portion has a predetermined fold which is one of the mountain fold and the valley fold.

14. The image reading system according to claim 13, wherein in a division mode of dividing the image data of the original read by the reading unit into image data for one page and image data for another page and writing the image data in the file as images of the two pages, the generating unit is configured to write, in the non-image area, fold information indicating that the folded portion exists in a page where the folded portion exists.

15. The image reading system according to claim 13, further comprising:
a specifying unit configured to specify a position of the folded portion if the determining unit determines that the folded portion exists,
wherein the fold information includes position information indicating the position of the folded portion specified by the specifying unit.

16. The image reading system according to claim 13, further comprising:
a confirming unit configured to inquire to a user whether to write the fold information in the non-image area,
wherein, if the confirming unit confirms that the fold information is not to be written in the non-image area, the generating unit is configured not to write the fold information in the non-image area.

17. The image reading system according to claim 13, wherein the determining unit is configured to determine that there exists a folded portion if a right-angled triangle image exists at a portion of the image data of the original corresponding to a corner of the original.

18. The image reading system according to claim 13, wherein if the original includes a plurality of pages and fold information for each page of the original is to be written in the non-image area, the generating unit is configured to write the fold information for each page of the original in a single non-image area of the file.

19. The image reading system according to claim 13, wherein if the original includes a plurality of pages and fold information for each page of the original is written in the non-image area, the generating unit is configured to write the fold information for each page of the original in a non-image area of the file provided correspondingly to the image data of the corresponding page.

* * * * *